July 3, 1951 D. G. TROWBRIDGE 2,558,994
TOOL FOR APPLYING ANTISKID CHAINS
Filed June 8, 1946

INVENTOR
Dale G. Trowbridge
BY
Wooster & Davis
ATTORNEYS

Patented July 3, 1951

2,558,994

UNITED STATES PATENT OFFICE 2,558,994

TOOL FOR APPLYING ANTISKID CHAINS

Dale G. Trowbridge, Stamford, Conn.

Application June 8, 1946, Serial No. 675,369

9 Claims. (Cl. 81—15.8)

This invention relates to a tool for applying anti-skid chains to the tires of an automobile, and has for an object to provide an improved and simplified construction which may be readily applied to the tire, and will firmly grip and hold itself onto the tire during the operation of applying the chain.

Another object is to provide a device of this character which may be readily carried in a car and will not require a great deal of space, one which may be easily and quickly applied to the tire and to which the chain may be easily and quickly attached or from which it may be as easily and quickly detached.

A further object is to provide a construction which will be very strong and rigid for the amount of metal used in its construction, and therefore will be of relatively light weight.

A still further object is to provide a device which when applied to the tire will give sufficient traction to pull the car out of a ditch or away from the curb, even in ice or snow, and then be easily and quickly taken off. It is therefore an object to provide a device which may be used either for this purpose, or for applying a chain.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figures 1, 2:
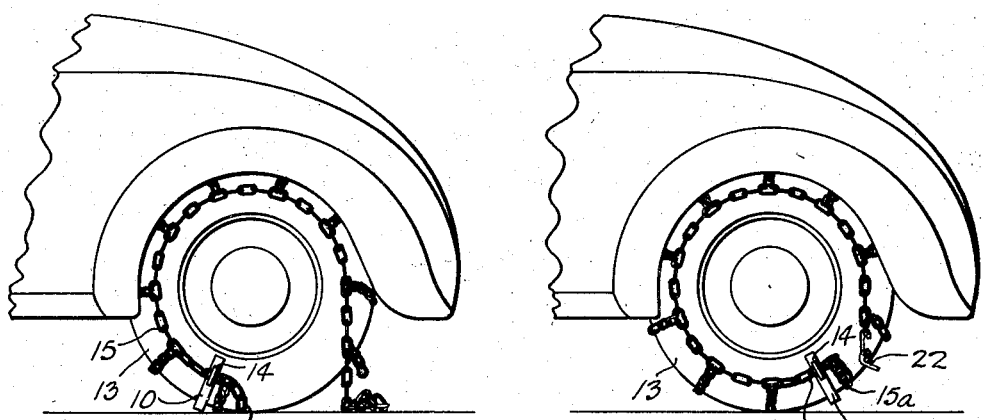
Fig. 1 is a side elevation of the rear end portion of a car showing how the device may be applied at the beginning of the operation of applying a chain to a tire.
Fig. 2 is a similar view showing the device after it has drawn a chain around the tire in position so the ends of the chain may be attached.
Figure 5:
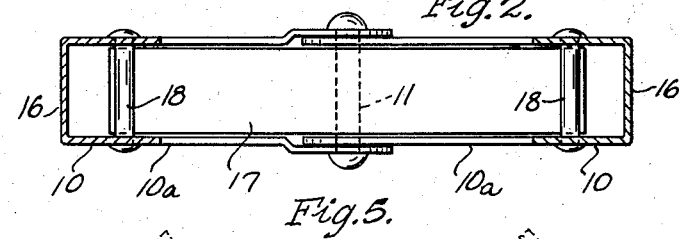
Fig. 5 is a section of the device substantially on the line 5—5 of Fig. 3.

This device comprises a pair of arms or jaws 10 pivoted together at 11 by any suitable means, such for example as a transverse rivet. These arms or jaws are preferably of a substantially U shape in cross section, as this gives a strong rigid construction with much less metal, making it much lighter in weight and stronger for a given amount of material. At the upper ends of the arms are gripping jaws 12 adapted to grip the sides of the tire 13 above the widest diameter of the tire, the arms being of sufficient length to locate these grips above this widest diameter. On the outer side of each arm is a clip 14 to hold a link of a side chain, indicated at 15. This clip 14 may be formed by cutting the transverse connecting wall 16 of the arm along the top and two spaced sides and then bending the portion between the cuts outwardly to the position indicated. A link of the side chain may be slipped over these clips and will be firmly held by them.

Figures 3, 4:
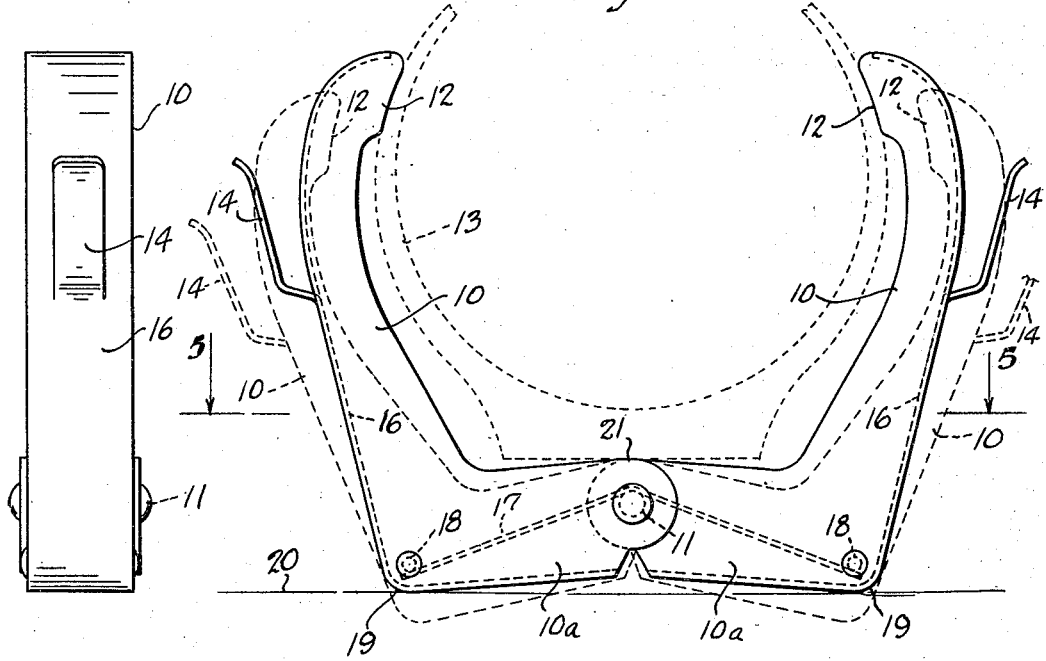
Fig. 3 is a side elevation of the device on a larger scale, showing how it may be applied to a tire.
Fig. 4 is a side view looking from the left of Fig. 3.

A fairly heavy flat spring 17 extends over the top of the pivot 11, and at its opposite ends are cross pins or rivets 18 spaced on opposite sides from the pivot 12 preferably substantially at the corner of the two angularly arranged portions of the arms 10, these arms being preferably of generally L-shape, as indicated in Fig. 3, so that at the angle between them is a rounded corner or elbow 19, adapted to contact or be supported on the ground or pavement 20 under certain conditions, as will presently be described. This spring 17 tends to force the free ends of the arms 10 toward each other to press the grips 12 against the sides of the tire.

In applying the device to a tire, the free ends of the arms 10 are pulled apart, as shown in dotted lines, Fig. 3, and slipped over the tire with the jointed lower connection on the tread of the tire and preferably at the front side of the wheel, as indicated in Fig. 1. In doing this the spring 17 is further tensioned so that the grips 12 are held more firmly and tightly against the walls of the tire, and also, as shown in Fig. 3, the pivot 11 and the connected ends of the horizontal arm portions 10a are raised above the curved elbows 19, so that if the tire rolls over it these elbows or curved corners 19 will engage the ground of pavement 20, and the weight of the tire being applied at the point 21 above the pivot 11 tends to force this point and the pivot downwardly to swing the arms about the corners or elbows 19 as pivots and still more firmly clamp the arms and their grips 12 against the opposite sides of the tire in addition to the pressure exerted by the spring 17, so that there is no danger of this clamp slipping on the tire.

In use, in applying a chain to a tire, if the skirt of the mudguard is not too low the clamp is applied as shown in Fig. 1, just in front of the point where the tire contacts the pavement, with a link of a side chain 15 adjacent one end of the chain on each side of the tire hooked over the clips 14, and then the rest of the chain is laid over the top of the tire, as shown. Now if the car is run forwardly a short distance so as to run over the clamp from the position of Fig. 1 to that of Fig. 2, the clamp is more firmly clamped on the tire during this movement by the action described above due to the weight of the tire on the raised connecting point 21, so that there is no danger of the clamp slipping during this movement, and the forward ends of the side chains, as indicated at 15a, are brought into close relation with the side hooks 22, and the side chains may be hooked together. The clamp may then be easily removed and the chain left applied to the tire.

If the skirt and the mudguard are down so low over the wheel that it is difficult or impossible to swing the chain over the top of the wheel, then the clamp 10 may be placed on the rear portion of the tire substantially as shown in Fig. 2, or even higher, and the end links of the chain placed in the clips 14. The chain is then piled or placed close to the tire. The car is then moved forward, pulling the chain up over the tire, and stopped with the clamp or tool 10 in substantially the position of Fig. 2, when the ends of the chain can then be easily connected.

Due to the firm grip of the clamp on the tire, and especially the increased grip caused by the weight of the tire on the raised intermediate point 21 over the connecting pivot 11 acting with the curved elbow points 19 as pivots, this clamp will provide enough traction to pull the car out of a ditch or away from the curb should the wheels be spinning, even in ice or snow, and then it may be readily removed. This clamp can, therefore, be used either as a clamp for holding or applying a chain to a tire or as a traction element in an emergency to pull the car out of a ditch or away from the curb. Also, if one wheel should spin in applying the chain or trying to pull away from a curb, one of these clamps can be put onto this wheel to hold the spinning wheel while applying a chain to the other wheel.

Having thus set forth the nature of my invention, I claim:

1. A tool of the character described comprising a pair of substantially L-shaped levers each including side and lower arms and arranged in opposed relation with the free ends of the lower arms pivoted together, the angular portion of each lever at the connection between the arms of each lever being spaced from the pivotal connection between the arms and each forming a supporting pivot when resting on a pavement with the lower arms inclined upwardly and inwardly toward their pivotal connection, the side arms of the levers including clamps to clamp the side walls of a tire and each provided with a clip to hold a link of a side chain of an antiskid chain, and a spring tending to force the jaws together to clamp them on a tire.

2. A tool of the character described comprising a pair of levers each comprising a pair of angularly arranged side and lower arms forming an elbow between them, means for pivoting the ends of the lower arms together, said side arms clamping against the side walls of a tire and each provided with a clip to hold a link of a side chain, said elbows being below the pivot and when resting on a pavement providing supporting pivots for the levers with their lower arms inclined upwardly and inwardly toward their pivotal connection, and a spring tending to shift the free ends of the side arms toward each other to clamp the tool on a tire.

3. A tool of the character described comprising a pair of levers each comprising a pair of angularly arranged side and lower arms forming an elbow between them, means for pivoting the ends of the lower arms together, said side arms clamping against the side walls of a tire, said elbows being below the pivot and when resting on a pavement providing supporting pivots with the lower arms inclined upwardly and inwardly toward their connecting pivot, and a spring tending to shift the free ends of the side arms toward each other to clamp the tool on a tire.

4. A tool of the character described comprising a pair of angularly shaped levers including side arms for clamping the sides of a tire and lower arms pivoted together at their free ends, the side and lower arms of each lever being angularly arranged to form an elbow between them, said elbow resting on a pavement and forming a pivot support when clamped on a tire with the lower arms inclined upwardly and inwardly toward their pivotal connection, a spring tending to clamp the side arms on a tire, and each side arm being provided with means to hold a link of a side chain to draw it about a tire.

5. A tool of the character described comprising a pair of angularly shaped levers including side arms for clamping the sides of a tire and lower arms pivoted together at their free ends, the side arms being provided with means to grip the sides of a tire and means to hold a link of a side chain, holding means on each lever spaced laterally from the pivotal connection for the lower arms, and a bar spring extending over said pivotal connection and under said holding means and stressed so as to tend to shift the side arms toward each other to clamp a tire.

6. A tool of the character described comprising a pair of angularly shaped levers including side arms for clamping the sides of a tire and lower arms pivoted together at their free ends, said arms being of substantially U-shape in cross section with spaced side walls, the side arms being provided with grips adjacent their free ends to engage the sides of a tire, transverse pins extending between the side walls of the levers and spaced laterally from the pivotal connection at the free ends of the lower arms, and a bar spring extending over the pivotal connection and under said pins at its free ends and stressed so as to tend to clamp said grips on a tire.

7. A tool of the character described comprising a pair of levers including spaced side walls and a connecting outer wall forming a substantially U-shaped cross section, said levers each comprising a side arm and a lower arm angularly arranged to form an elbow between them, a transverse pivot connecting the free ends of the lower arms, said side arms being provided with grips adjacent their free ends to clamp the sides of a tire, an outwardly and upwardly extending clip on each side arm for holding a link of a side chain, transverse pins between the side walls of each arm spaced laterally from the pivot, a bar spring extending over the pivot and under the pins at its opposite ends and stressed so as to tend to clamp said grips on a tire, and said elbows being below the pivot and each resting on a pavement to form a supporting pivot for the tool when under a tire.

8. A tool of the character described comprising a pair of levers each including a side arm and a lower arm angularly arranged to form an elbow between them, means for pivotally connecting the free ends of the lower arms, means adjacent the free ends of the side arms to clamp the sides of a tire, a spring tending to swing the arms to clamp said means on the tire, and said elbows being below the pivot and each resting on a pavement to form a supporting pivot for the tool when under the tire with the lower arms inclined upwardly and inwardly toward their connecting pivot so that pressure of the tread of the tire on the free ends of the lower arms over the pivot will more firmly clamp said side arms on the tire.

9. A tool of the character described comprising a pair of levers including spaced side walls and a connecting outer wall forming a substantially U-shaped cross section, said levers each comprising a side arm and a lower arm angularly arranged to form an elbow between them, a transverse pivot connecting the free ends of the lower arms, said side arms being provided with grips adjacent their free ends to clamp the sides of a tire, transverse pins between the side walls of each arm spaced laterally from the pivot, a bar spring extending over the pivot and under the pins at its opposite ends and stressed so as to tend to clamp said grips on a tire, and said elbows being below the pivot and each resting on a pavement to form a supporting pivot for the tool when under a tire.

DALE G. TROWBRIDGE.

REFERENCES CITED

The following references are of record in the file of this patent:

UNITED STATES PATENTS

| Number | Name | Date |
|---|---|---|
| 588,209 | Yocum | Aug. 17, 1897 |
| 906,385 | Christians | Dec. 8, 1908 |
| 1,468,582 | Stockard | Sept. 18, 1923 |
| 1,499,036 | Smith | June 24, 1924 |
| 1,602,317 | Akers | Oct. 5, 1926 |
| 1,619,170 | Vosburgh | Mar. 1, 1927 |
| 1,886,874 | Draim | Nov. 8, 1932 |
| 2,076,894 | Johnson | Apr. 13, 1937 |
| 2,197,310 | Lincoln | Apr. 16, 1940 |
| 2,445,947 | Hoppes | July 27, 1948 |